Feb. 3, 1931.  C. H. BRASELTON  1,791,239
POWER GENERATING MECHANISM
Original Filed Sept. 4, 1919    3 Sheets-Sheet 3
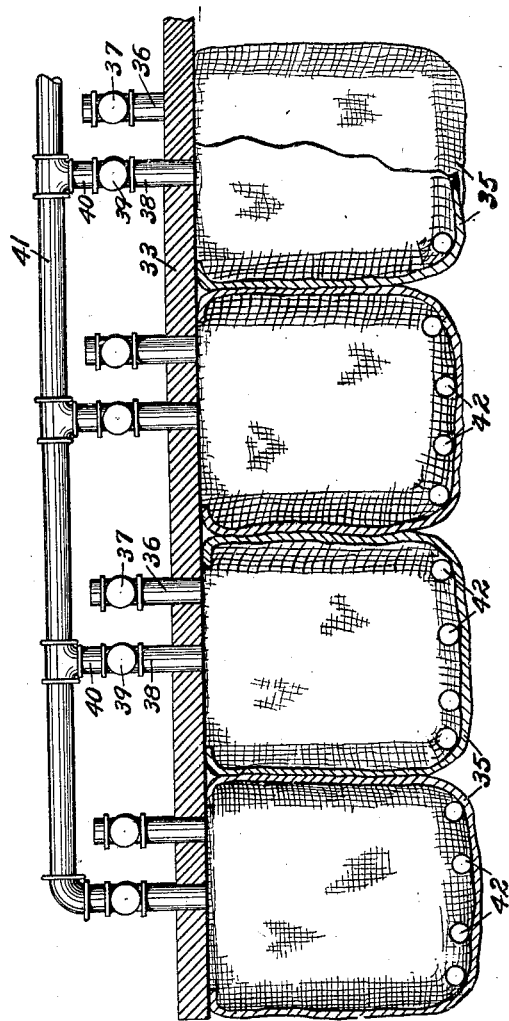
INVENTOR.
Chester H Braselton Patented Feb. 3, 1931

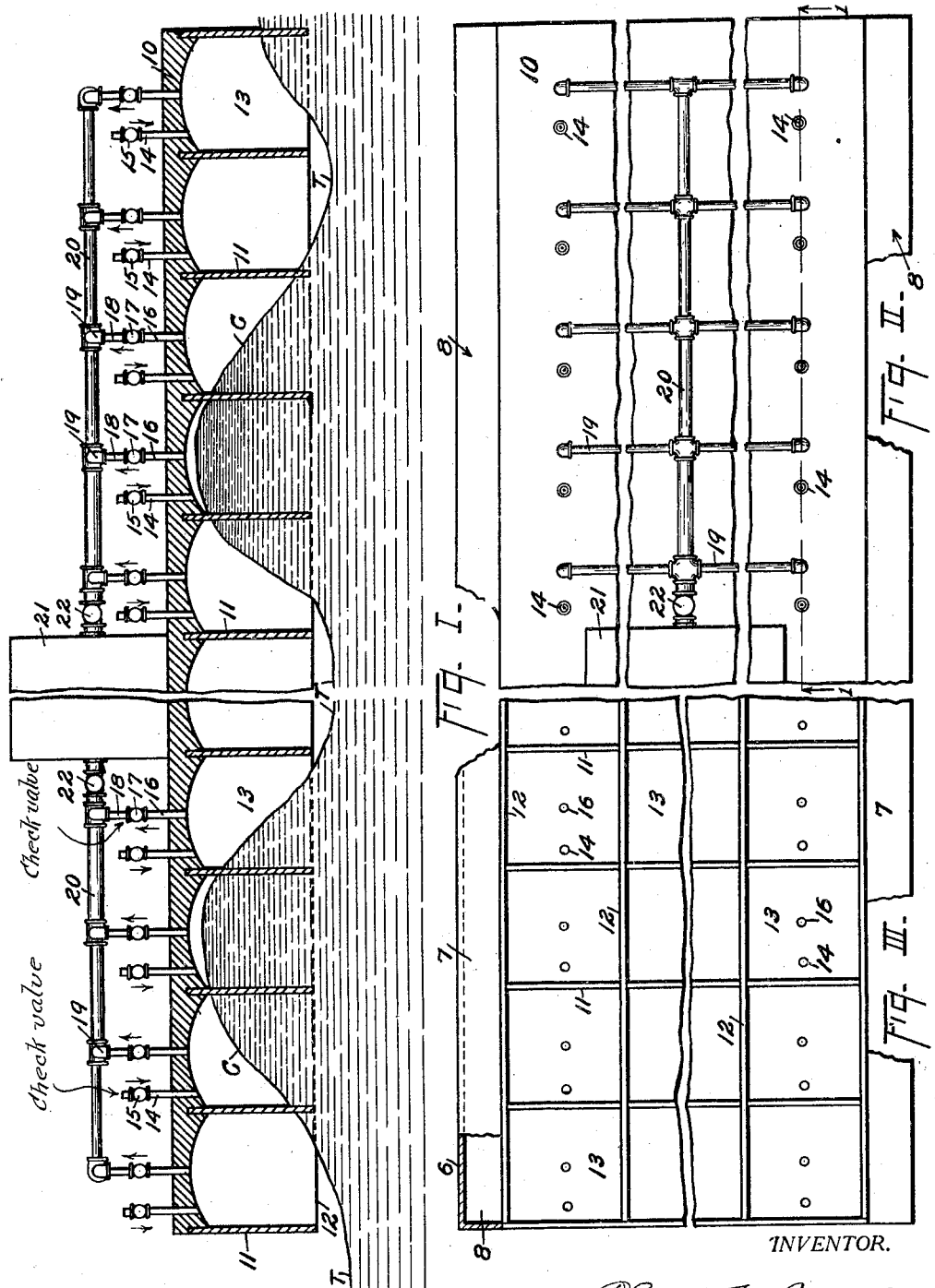

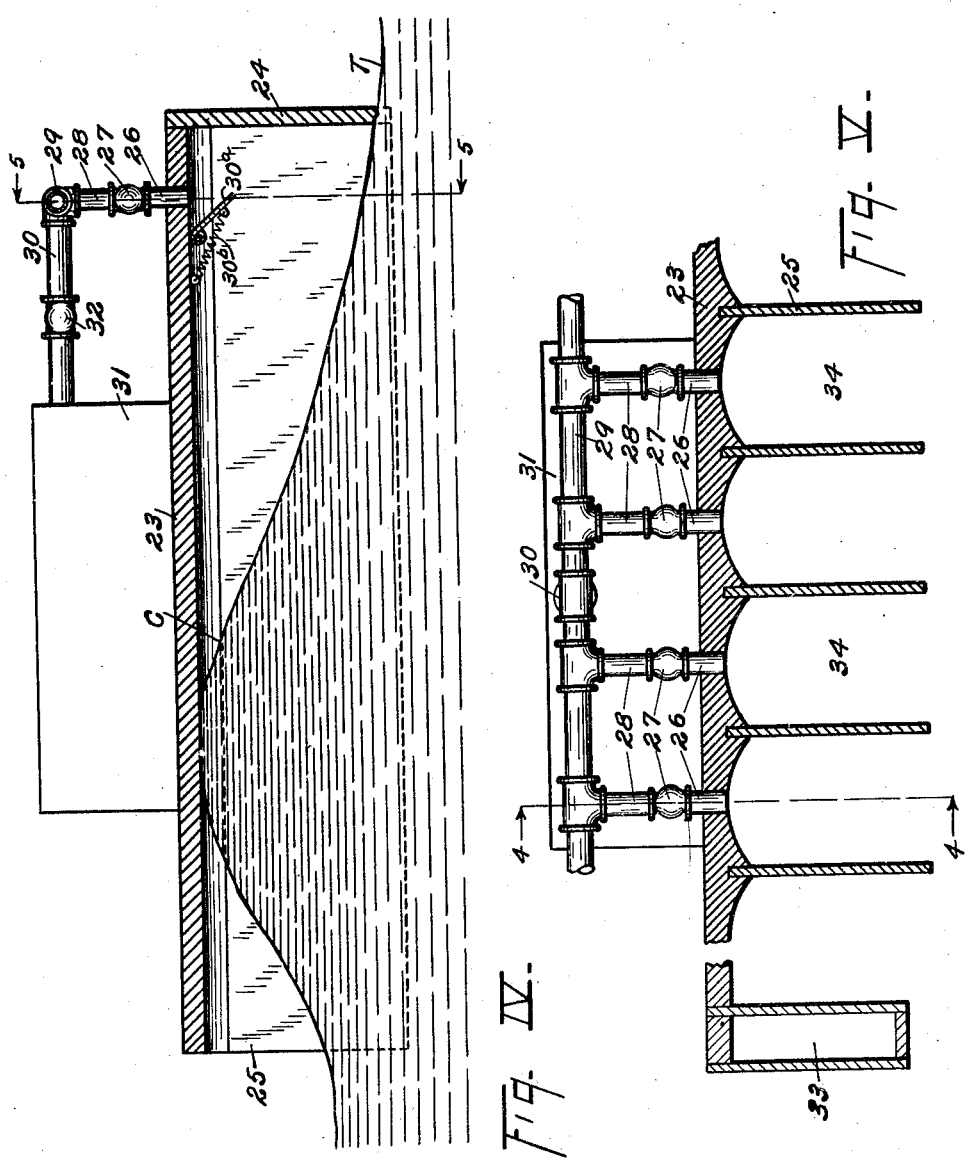

1,791,239

UNITED STATES PATENT OFFICE

CHESTER H. BRASELTON, OF NEW YORK, N. Y.

POWER-GENERATING MECHANISM

Application filed September 4, 1919, Serial No. 321,628. Renewed December 16, 1929.

This invention relates to power generating mechanism and more particularly to methods and means for converting the energy of the waves into power which may be applied conveniently to do useful work.

The principal object of this invention is to provide methods and means for converting the energy of the waves into power which may be utilized to perform useful work.

Another object of the invention is to provide methods and means whereby the kinetic energy of the moving waves may be converted into potential energy which may be stored up and controlled so as to do useful work.

A further object of this invention is to provide simple and practicable means whereby the kinetic energy of the moving waves may be utilized to store fluid under pressure.

A further object of this invention is to provide means whereby the moving waves act as fluid pistons to compress a fluid which may be stored under pressure.

A further object of the invention is to provide means whereby the moving waves are utilized to lift a fluid and store it in an elevated position, the kinetic energy of the waves being thus converted into potential energy.

Still another object of the invention is to provide floating means adapted to be supported by the body of water and provided with devices whereby the energy of the waves is converted into power adapted to perform useful work.

Another object of the invention is to provide means on the floating structure for storing up the potential energy into which the kinetic energy of the waves is converted.

With these and incidental objects in view, the invention consists of certain novel features of construction and combination of parts, the essential elements of which are set forth in appended claims and preferred forms of embodiment of which are hereinafter described with reference to the drawings which accompany and form part of this specification.

Of said drawings:

Figure I is a sectional view partially broken away, through a structure embodying my invention, the section being taken substantially on the line I—I of Figure II.

Figure II is a fragmentary, top plan view.

Figure III is a fragmentary, bottom plan view.

Figure IV is a sectional view through a modified construction, the section being taken substantially on the line IV—IV of Figure V.

Figure V is a transverse, fragmentary, sectional view, taken substantially on the line V—V of Figure IV, and Figure VI is a fragmentary, sectional view, illustrating still another modification.

Considering the numbered parts of Figures I, II and III of the drawings, a platform 10 is adapted to float on the surface of the large body of water. This platform has, extending downwardly therefrom a suitable distance, longitudinally extending walls 12 and transverse walls 11, which form, with the platform 10, a plurality of chambers 13 open at the bottom. An enclosed and sealed air or vacuum compartment 8 is formed at each longitudinal side of the platform 10, preferably throughout its length, each chamber being formed by an outside vertical wall 6, the adjacent outside wall 12, the two end walls 11, the platform, and a bottom horizontal wall 7 which closes the air chamber. The size of these chambers depends, of course, on the size of the platform and are proportioned so that the whole structure rides on top of the crests C of the waves which preferably do not contact with the bottom side of the platform 10 when the waves rise in the chambers 13. Each chamber 13 has an intake pipe 14 entering the top thereof and provided with a one-way valve 15 which permits air to enter through the intake pipe into the chamber, but prevents it from passing out in the opposite direction. An outlet pipe 16 enters the top of each chamber and is provided with a one-way valve 17 permitting air to pass out of the chamber, but preventing its passage in the opposite direction. The valves 17 are connected by pipes 18 with the cross pipes 19 which feed into the mains 20 leading to a storage reservoir 21 supported on the platform 10. One-way valves 22 may be placed in the mains 20 between the reservoir 21 and the nearest cross pipes 19 so as to prevent the compressed air in the reservoir passing back through the mains.

The above described structure is placed on the surface of a body of water so that the enclosed air compartments 8 and walls 12 extend in the same direction as the lateral movement or advance of the waves, as illustrated in Figure I. The structure is preferably anchored in any suitable manner and the air compartments 8 support the structure on the waves so that the crests of the waves do not contact with the platform 10 when they rise in the chambers 13. As a wave travels under and longitudinally of the floating platform, which in length may be any number of wave lengths, the water forming the crest of a wave acts as pistons in the successive transverse rows of air chambers to trap the air therein and then force it out of the respective outlet pipes 16 as the water rises in the air chambers. This operation obviously takes place when it is recalled that as a wave moves longitudinal of the structure, that is laterally, the water itself does not move laterally but only vertically, the water being raised in a transverse row of air chambers 13 as the crest of the waves moves in line with the respective rows and then falling as the crest moves from under the row to the succeeding rows. As the water rises in the air chambers 13, the air in the chambers is displaced by the water so that the air is compressed and forced through the outlet pipes 16, past the valves 17, through the pipes 18 and 19 and the mains 20 and past the valves 22 into the air reservoir 21 where it is stored under pressure. When the water falls in an air chamber 13, as the crest of the waves moves laterally beyond the chamber, there is a tendency to create a vacuum and hence the valves 15 open and air is again admitted into the chamber through the respective inlet pipe 16.

In Figure I the height of the walls 11 and 12 is shown as being less than the vertical height of the waves from the bottom of the troughs T to the tops of their crests C. If this condition constantly existed the inlet pipes could be dispensed with as air would be admitted to the air chambers 13 through the troughs as soon as the open or bottom sides of the chambers were opened by the falling water. When, however, the waves are not of greater height than the walls 11 and 12, the lower portions of the latter are always submerged and air is only admitted into the air chambers through the inlet pipes 14.

The air, which is compressed and stored under pressure in the reservoir 21, may be utilized to perform work in any suitable manner. For instance, it may be used to drive an air turbine or motor. The reservoir 21 may, of course, be located on a stationary foundation or on the shore and the air passing through the mains 20 may be conducted to the reservoir by suitable flexible pipes. It is also obvious that instead of storing the air in the reservoir under pressure it may be utilized directly to perform useful work.

In Figures IV and V, I have shown a modified construction, in which there is a platform 23 adapted to float on the surface of the body of water. This platform 23 has a downwardly extending end wall 24 and the longitudinally extending walls 25 which form, with the platform 23, a plurality of longitudinally extending compartments 34 open at the bottom and one end. The platform is so disposed on the surface of the water that the open ends of the compartments 34 face in the general direction from which the waves approach. Outlet pipes 26 enter the compartments, near the closed ends thereof, and are provided with one-way valves 27 permitting air to pass out of the compartments through said pipes but preventing its passage in the opposite direction. Pipes 28 connect the one-way valves 27 with a cross-pipe 29 which communicates with a main 30 leading to the storage reservoir 31 preferably supported on the platform 23. A one-way valve 32 may be provided in the main 30 between the cross pipe 29 and reservoir 31 to prevent the air in the reservoir from passing back through the main 30. Enclosed air compartments 33 at the sides of the platform and similar to the enclosed air compartments 8 of the preferred form, may be employed to maintain the platform 23 in proper position relative to the waves, the lower portions of walls 24 and 25 being preferably constantly submerged so that the air compartments 34 are always closed at the bottom by the water. Valves 30a are hinged to the platform 23 adjacent the lower ends of the pipes 26 and are normally held open by gravity or springs 30b.

As the crest of a wave moves longitudinally of the walls 25 it contacts with the bottom of the platform 23 thus sealing the compartments and trapping the air therein. As the crest moves towards the closed ends of the compartments, closed by the wall 24, the air is compressed and forced out through the pipes 26, past the valves 27, through pipes 28, cross pipe 29, main 30 and past valve 32 into the reservoir 31 where it is stored under pressure. The valves 30a are provided to prevent water from entering the pipes 26, the valves being closed when the crest of the wave strikes the valves and moves them to closed position. In Figure IV the platform 23 is shown as being but one wave length long, that is in length from the wall 24 to the opposite end of the platform, but it is obvious that it may be any desired wave lengths long.

In Figure VI the platform 33 is adapted to be supported by crests of the waves. Secured in any desired manner to the bottom side of the platform are a plurality of air bags 35 which may be of any number or size and arranged in rows or any other desired manner. The bags 35 are preferably formed of any waterproof flexible material and are secured at their tops to the bottom of the platform in such a water tight manner that water cannot seep over the tops and into the bags. Weights 42 or other suitable means are secured to the bags near their bottom portions so that normally they are maintained in extended or open position and assume such position after the air has been forced out of them by the waves. An inlet pipe 36, extending through the platform 33 is provided for each air chamber formed by a bag 35 and the platform 33. The valves 37 in the pipes 36 are constructed to admit air to the bags but prevent the air from escaping in the opposite direction. The outlet pipes 38, one for each bag 35, extend through the platform 33, and are provided with valves 39. Pipes 40 connect the valves with cross pipes which open into mains leading to an air reservoir in which the air is stored under pressure as desired above. The valves 39 permit passage of the air from the bags 35 through the outlet pipes 38 but prevent the air from passing in the opposite direction.

As the crest of a wave travels laterally under the platform 33 it contacts successively with the bags 35 and crushes or folds them against the bottom of the platform thereby forcing the air out of the bags, through the outlet pipes 38, past the valves 39 through the pipes 40 and 41 and the mains into the storage reservoir. As the crest of a wave moves out of contact with the bags, the bags open up and are again filled with air which enters through the pipes 36, the valves 37 then being opened by atmospheric pressure. The bags open up due to their own weight and the weight of the weights 42, the bags then being suspended in the troughs of the waves.

It is thought that the construction and operation of the invention will be clearly understood from the above detailed description. To recapitulate, however, it may be said that in the preferred form illustrated in Figures I, II and III, and in the modified form shown in Figures IV and V, the water of the crests of the waves, as they travel laterally, first closes the air chambers, provided with suitable conduits and valves, and then acts as pistons to compress the entrapped air and force it through the outlet pipes and mains into the reservoirs where the air is stored under pressure. In the modified form shown in Figure VI the crest of each wave, as it travels laterally under the floating platform, crushes the successive rows of bags thereby forcing the air out of the bags through the pipes and mains into the air reservoir, air being admitted through the inlet pipes as the bags open up in the troughs of the waves.

It will be observed that in the forms of embodiment disclosed, the entire power generating mechanism is supported by the water waves. The air reservoir is preferably carried on the platform so that the potential energy is stored on the same structure which converts the kinetic energy of the waves into the potential energy. As the mechanism is supported by the water, the size of the waves may vary dependent upon the weather and other natural conditions, but they continuously generate power although, of course, the power developed at any time depends more or less upon the size of the waves. Furthermore, as the structure is supported by the water, it may be readily moved from place to place and no permanent foundation or base erected on the bottom of the body of water is necessary.

I am aware that the particular forms of embodiment of the invention, which I have here shown and described, are susceptible of considerable variation without departing from the spirit thereof, and therefore, I desire to claim the same broadly, as well as specifically, as indicated by the appended claims.

What I claim as new and desire to secure by Letters Patent is:—

1. In apparatus of the class described, the combination of a platform adapted to float freely on a water surface; a plurality of intersecting depending walls forming cells having open bases fixed to said platform; inlet and outlet conduits connected through said platform to said cells; valves in said conduits; and means for maintaining said platform normally above contact with waves in said water surface.

2. In apparatus of the class described, the combination of a platform adapted to float on a wave surface; a plurality of intersecting depending walls forming cells having open bases fixed to said platform; inlet and outlet conduits connected through said platform to said cells; valves in said conduits; and means including a closed air chamber for maintaining said platform normally above contact with said waves.

3. In a wave motor, the combination of a platform adapted to float on the surface of the waves; a plurality of depending and intersecting walls forming cells fixed to the base of said platform normally subject to the action of said waves; buoyant means for maintaining the platform normally above said waves; inlet and outlet ports communicating with said cells; and valves in said ports permitting alternate inflow or outflow of air, in accordance with the reciprocating movement of said waves.

4. In a wave motor, the combination of a platform adapted to float on a wave surface; a plurality of intersecting walls depending from the under surface of said platform forming a cellular structure over the entire base of said platform, the base of said cells being open; buoyant means for normally preventing contact of said platform with the wave surface; inlet and outlet conduits connected to said cells; one-way valves in said conduits adapted to permit movement of air through said air conduits, the inflow movement being only through said inlet conduits and the outflow movement being only through said outlet conduits.

5. In a wave motor, the combination of a platform adapted to float on a wave surface; a plurality of intersecting walls depending from the undersurface of said platform, forming a cellular structure over the entire base of said platform; inlet and outlet conduits connecting to said cells; one-way valves in said conduits adapted to permit movement of air through said air conduits, the inflow movement being only through said inlet conduit, and the outflow movement being only through said outlet conduits; said cellular structure permitting movement of the crests of the waves along the undersurface of the platform.

6. In a wave motor, the combination of a floating platform adapted to span a plurality of waves; depending and intersecting walls forming a plurality of cells fixed to the base of said platform, said cells having open bases; buoyant means for normally preventing said platform from being submerged under said wave surface; inlet and outlet conduits connected to said cells; and one-way valves positioned in said conduits.

7. In a wave motor, the combination of a floating platform adapted to span a plurality of waves; depending and intersecting walls forming a plurality of cells fixed to the base of said platform, said cells having open bases; buoyant means for normally preventing said platform from being submerged under said wave surface; inlet and outlet conduits connected to said cells; and one-way valves positioned in said conduits, the depth of said cells being approximately equal to the width thereof.

8. In apparatus of the class described, the combination of an elongated freely floating platform adapted to span a plurality of waves; a plurality of intersecting depending walls forming cells having open bases fixed to said platform; inlet and outlet conduits connected through said platform to said cells; valves in said conduits; and means for maintaining said platform normally above contact with said waves.

9. In apparatus of the class described, the combination of a water float member forming a solid and approximately flat surface; depending vertical walls forming chambers attached to the inner surface of said float member; inlet and outlet air conduits to said chambers attached to the float member; and one-way valves in said conduits permitting alternate inflow and outflow of air to said chambers in accordance with the up and down movement of the water surface toward the float member, said chamber structure permitting movement of the wave crests of the water along a plane adjacent to the under surface of the float member.

10. In a wave motor, a buoyant member constructed to float in stable equilibrium with its top above the surface of the water and to provide a considerable degree of lag with reference to wave movements, air chambers occupying the available space at the lower side of said top and exposed to the surface of the water to enable the air therein to be compressed by the rising surface of the water, inlets and outlets for said air chambers, and one-way valves controlling said inlets and outlets to permit alternate inflow and outflow of air in accordance with the downward or upward movement of the water surface with respect to said buoyant member.

11. In a wave motor, a water float member of such normal height above water and corresponding horizontal dimensions as to provide stability, and including depending walls enclosing air traps, inlets and outlets connected with the upper parts of said air traps, and one-way valves for said inlets and outlets providing for alternate inflow and outflow of air in accordance with downward and upward movement of the surface of said traps.

12. In an apparatus of the class described, a buoyant member adapted to be freely supported by a body of water at all times and to provide a considerable degree of lag with reference to wave movements, means beneath said member providing an air chamber, an inlet valve and an outlet valve for said chamber permitting alternate inflow and outflow of air into the same in accordance with the relative movement of the water surface with respect to said inertia member.

13. In an apparatus of the class described, a buoyant interia member adapted to rest upon and be freely supported by a body of water at all times, means beneath said member providing an air trap, an inlet valve and an outlet valve in said trap permitting alternate inflow and outflow of air into the same in accordance with the relative movement of the water surface with respect to said inertia member.

14. In a motor adapted to float on a body of water and to be operated by the waves formed thereon, the combination of a plurality of cellular chambers, inlet and outlet conduits for each of said chambers, one way valves in said conduits permitting flow of air to and from said chambers, and means for uniting said chambers in a single float member of such horizontal dimensions as to provide stability, said member and chambers forming a body of such buoyancy as to maintain normally the top of the chambers above the wave trough, and of such form as to bring about a lag in the movement of the float member relative to the wave movement.

15. In a wave motor a float member of sufficient mass to possess a considerable degree of inertia, said member having a plurality of chambers therebeneath adapted to have air therein compressed by the action of the surface of the water, and inlet and outlet conduits for said chambers, said conduits leading from said chambers to a point of delivery, said member being adapted to be supported on the crests of a plurality of waves in spaced relation with respect to the troughs existing between said crests and the chambers being arranged so that a series thereof extends over a corresponding plurality of waves.

16. In a wave motor a float member of such structure as to possess a considerable degree of inertia, said member having a plurality of open ended chambers therebeneath adapted to have air therein compressed by the action of the surface of the water, and inlet and outlet conduits for said chambers, said conduits leading from said chambers to a point of delivery, said member being adapted to be supported on the crests of a plurality of waves in spaced relation with respect to the troughs existing between said crests.

17. In a wave motor a water float member of such structure as to possess a considerable degree of inertia, and a plurality of air chambers beneath said member adapted to have air therein compressed, said member being adapted to be supported by the crests of a plurality of waves in spaced relation to the trough existing between said waves whereby shifting of said trough with respect to said chambers will compress air therein.

18. In a wave motor a water float member of such structure as to possess a considerable degree of inertia, and a plurality of open ended air chambers beneath said member adapted to have air therein compressed, said member being adapted to be supported by the crests of a plurality of waves in spaced relation to the trough existing between said waves whereby shifting of said trough along said chambers will compress air in the chambers.

19. In a wave motor a water float member, and a plurality of air chambers beneath said member adapted to have air therein compressed, said member being adapted to be supported by the crests of a plurality of waves in spaced relation to the trough existing between said waves whereby shifting of said trough along said chambers will compress air in the chambers.

20. In apparatus of the class described a buoyant inertia member to rest upon and be freely supported by a body of water, means beneath said member providing an air trap, an outlet valve in said trap permitting outflow of air from said air trap in accordance with the relative movement of the water surface with respect to said inertia member.

21. In a wave motor a water float member having a plurality of open ended chambers therebeneath, said chambers being adapted to have air compressed therein by the rising action of the surface of the water, and valve means for conveying air from said chambers to a point of delivery when air in said chambers is compressed by the rising action of said water surface with reference to the float member and for preventing inflow of air when said water surface recedes from said float member.

22. In a wave motor a water float member constructed to provide a considerable degree of lag with reference to wave movements, and a plurality of closed air chambers beneath said member adapted to have air therein compressed, said member being adapted to be supported by the crests of a plurality of waves in spaced relation to the trough existing between said waves whereby shifting of said trough with respect to said member will compress air in the chambers.

23. In a wave motor a water float member constructed to provide a considerable degree of lag with reference to rising movement of the surface of the water having a plurality of closed chambers therebeneath, said chambers being adapted to have air compressed therein by the rising action of the surface of the water, and means for conveying air from said chambers to a point of delivery.

24. In apparatus of the class described, the combination of a water float member, depending walls forming chambers attached to said float member, inlet and outlet air conduits connected to said chambers, and one-way valves in said conduits permitting flow of air in and to said chambers in accordance with the up and down movement of the water surface, the construction of said chambers being such as to permit depth variation therein through movement of the wave crests.

25. In an apparatus of the class described, a buoyant member adapted to be freely supported by a body of water at all times and to provide a considerable degree of lag with reference to wave movements, means beneath said member providing an air chamber, and inlet and outlet means for the chamber providing for alternate inflow and outflow of air in accordance with the relative movement of the water surface with respect to said inertia member.

In testimony whereof, I affix my signature.

CHESTER H. BRASELTON.